US006305702B1

(12) United States Patent
Alford, II

(10) Patent No.: US 6,305,702 B1
(45) Date of Patent: Oct. 23, 2001

(54) QUICK-RELEASE ATTACHMENT DEVICE FOR MOTORCYCLES WITH CONCEALED RECEIVER ASSEMBLY

(76) Inventor: John T. Alford, II, 4615 34th St., Lubbock, TX (US) 79410

( * ) Notice: Subject to any disclaimer, the term of this patent is extended or adjusted under 35 U.S.C. 154(b) by 0 days.

(21) Appl. No.: 09/425,797

(22) Filed: Oct. 25, 1999

(51) Int. Cl.[7] ........ B60R 9/00

(52) U.S. Cl. ........ 280/204; 280/292; 280/491.5; 280/495

(58) Field of Search ........ 280/204, 202, 280/495, 497, 501, 416.2, 416.3, 292, 491.1, 491.5, 511, 491.2; D12/162; 224/423, 519, 520, 521; 180/219

(56) References Cited

U.S. PATENT DOCUMENTS

| | | | | |
|---|---|---|---|---|
| D. 273,486 | | 4/1984 | O'Rourke . | |
| D. 294,341 | | 2/1988 | Van Komen . | |
| D. 298,022 | | 10/1988 | O'Rourke . | |
| D. 308,353 | | 6/1990 | Allen . | |
| D. 334,163 | | 3/1993 | McVey . | |
| D. 409,557 | | 5/1999 | Armour . | |
| 2,978,260 | * | 4/1961 | Hebeisen | 280/495 |
| 3,598,426 | | 8/1971 | Spiese . | |
| 3,734,536 | * | 5/1973 | Dever et al. | 280/204 |
| 3,937,489 | * | 2/1976 | Hawes et al. | 280/204 |
| 4,283,072 | * | 8/1981 | Deloach, Jr. | 280/422 |
| 4,471,973 | | 9/1984 | Beckmann . | |
| 4,511,155 | * | 4/1985 | Galloway | 280/204 |
| 4,536,001 | * | 8/1985 | Wagner | 280/5 C |
| 4,685,691 | * | 8/1987 | Tremblay | 280/204 |
| 5,277,448 | * | 1/1994 | Colibert | 280/495 |
| 6,039,227 | * | 3/2000 | Stark | 224/521 |
| 6,095,387 | * | 8/2000 | Lipscomb | 224/485 |

OTHER PUBLICATIONS

Hitch Doc Trailer Hitches for Motorcycles advertisement, printed from Internet web site http://www.hitchdoc.com on Sep. 22, 1999.

* cited by examiner

*Primary Examiner*—Anne Marie Boehler
*Assistant Examiner*—Tony Winner
(74) *Attorney, Agent, or Firm*—Locke Liddell & Sapp LLP; Monty L. Ross

(57) ABSTRACT

A quick-release attachment device having a receiver assembly mountable in a concealed position under the rear fender of a motorcycle, the device being useful for quickly connecting and disconnecting load-supporting apparatus such as, for example, a trailer hitch, carrier platform, golf club carrier, or the like. The concealed receiver assembly desirably embodies two laterally spaced, longitudinal support members attachable to the motorcycle frame in a position that is hidden by the rear fender, a transverse support member interconnecting the longitudinal support members, and a downwardly inclined receiver member depending from the transverse support member to receive an upwardly inclined, projecting portion of a load-supporting apparatus that is insertable into the receiver member.

13 Claims, 5 Drawing Sheets

QUICK-RELEASE ATTACHMENT DEVICE FOR MOTORCYCLES WITH CONCEALED RECEIVER ASSEMBLY

BACKGROUND OF THE INVENTION

1. Field of the Invention

This invention relates to an attachment device for use on motorcycles, and more particularly, to an attachment device having a receiver assembly mountable beneath the rear fender of a motorcycle so as to be invisible to the ordinary observer standing behind the motorcycle, the device being attachable by a quick-release connector to a visible load-supporting apparatus such as a trailer hitch, insulated cooler carrier, golf club carrier or the like.

2. Description of Related Art

The design and use of motorcycle hitches is well known in the art. In a conventional motorcycle hitch assembly, the frame of the assembly is typically exteriorly attached to the frame of the motorcycle. A hitch ball is usually attached to the frame of the motorcycle hitch assembly by means of a threaded bolt and nut on the bottom of the ball. Conventional motorcycle trailer hitch devices are disclosed, for example, in U.S. Pat. No. 3,598,426; 4,471,973; D273,486; D294,341; D298,022; D308,353 and D334,163. Trailer hitches particularly designed for several brands and models of motorcycles are disclosed, for example, at the internet website www.hitchdoc.com of The Hitch Doc, Rt. 1, Box 204, Round Lake, Minn. 56167.

More recently, receiver hitches have been used with some vehicles as a means for quickly attaching and removing the hitch ball or for attaching other devices. U.S. Des. No. 409,557, for example, depicts a motorcycle apparently having a trailer hitch with a conventional ball but also discloses a golf club rack attached to the motorcycle using a visible square tubing receiver disposed below the ball. A disadvantage of prior art devices for attaching trailers or other load-carrying apparatus to the rear of motorcycles is that they are visible and unsightly, detracting from the overall appearance of the motorcycle, especially when not in use. An attachment device for motorcycles is therefore needed that is not visible to observers when not in use but that is quickly connectable to a trailer hitch or other load-carrying apparatus when desired. A device is disclosed herein which overcomes the deficiencies of prior art motorcycle hitch assemblies.

SUMMARY OF THE INVENTION

A quick-release attachment device is disclosed herein that has a receiver assembly mountable in a concealed position under the rear fender of a motorcycle for use in quickly connecting and disconnecting other load-supporting apparatus such as, for example, a trailer hitch, cooler carrier, golf club carrier, or similar auxiliary apparatus. The release assembly desirably embodies two laterally spaced, longitudinal support members attachable to the motorcycle frame from a position located under the rear fender, a transverse support member interconnecting the longitudinal support members, and a downwardly inclined receiver member depending from the transverse support member to receive an upwardly inclined, projecting portion of a load-supporting apparatus that is insertable into the receiver member.

BRIEF DESCRIPTION OF THE DRAWINGS

The apparatus of the invention is further described and explained in relation to the following figures of the drawings, wherein.

DESCRIPTION OF THE PREFERRED EMBODIMENTS

Figure 1:
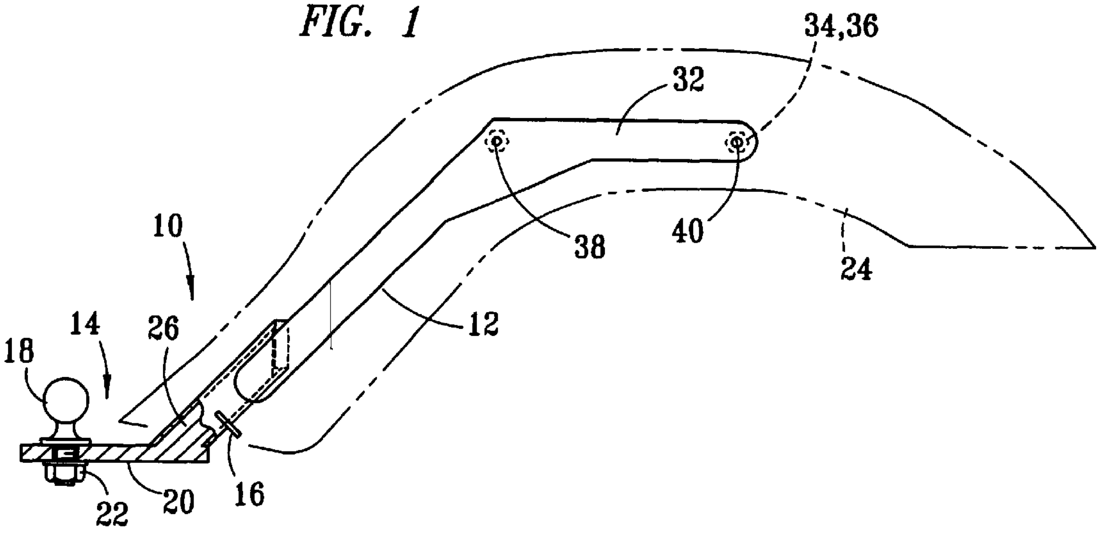
FIG. 1 is a side elevation view, partially in section, depicting the concealed attachment device of the invention with the receiver assembly installed under the rear fender (shown in phantom outline) of a motorcycle.
Figure 2:
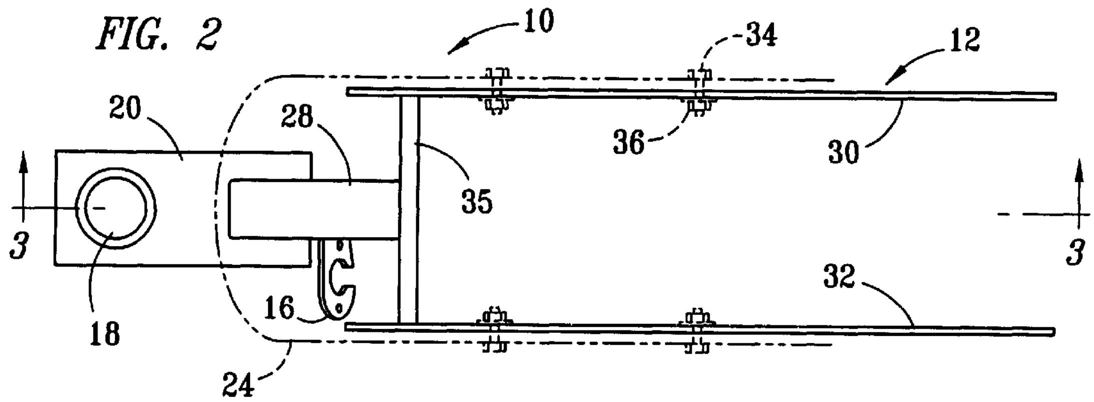
FIG. 2 is a top plan view depicting the concealed attachment device of the invention installed as in FIG. 1.
Figure 3:
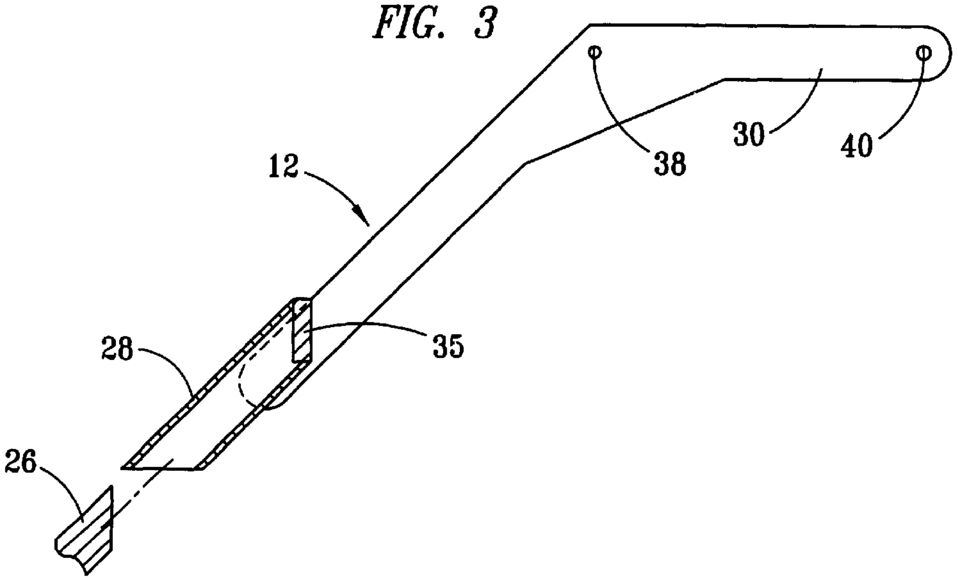
FIG. 3 is a side elevation view, partially in section, of the concealable receiver assembly of the invention, depicting the receiver member aligned with an upwardly inclined, projecting portion of a load supporting member (not shown) so as to enable the projecting portion to slidably engage the receiver member.
Figure 4:
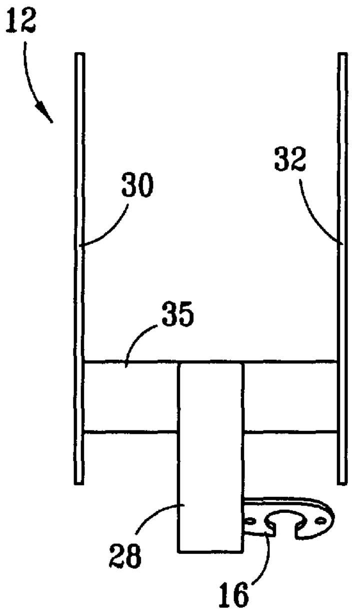
FIG. 4 is an elevation view of the receiver assembly of the invention, as seen from the rear when the receiver assembly is in essentially the same position as if installed under the rear fender of a motorcycle.

Referring to FIGS. 1–5, attachment device 10 of the invention preferably comprises receiver assembly 12 mounted in a hidden or concealed position beneath the rear fender 24 of a motorcycle (not shown) in combination with a load supporting member 14. A principal feature of the subject invention is a receiver assembly 12 that can be mounted beneath the rear fender 24 of a motorcycle so that receiver assembly 12 is not visible to an ordinary observer positioned either behind or to the side of the motorcycle, and therefore, does not in any way detract from the normal appearance features of the motorcycle. Receiver assembly 12 preferably comprises at least two laterally spaced, longitudinally extending support members 30, 32 that are interconnected by a rigid transverse support member 35. Receiver member 28 is connected, preferably by welding, to lateral support member 35 and is downwardly inclined to facilitate connection to load supporting apparatus 14. The configuration and placement of lateral support member 35 and receiver member 28 is preferably such that both fit within the space between rear fender 24 and the rear tire (not shown) without impeding tire rotation. Brake-light connector mounting bracket 16 is preferably attached or connected, such as by welding, to receiver member 28 to facilitate the attachment of an electrical connector for one or more tail lights or brake lights that are part of load supporting apparatus 14 or, for example, a trailer connected thereto.

Because receiver assembly 12 will provide the structural connection between a load supporting apparatus 14 and the motorcycle, it is important that receiver assembly be securely attached, either permanently or releasably, to the motorcycle frame. Receiver assembly 12 is preferably made of steel, and is desirably configured so as to be attachable to the motorcycle frame through bolt holes 38, 40 using a plurality of fasteners such as bolts 34 and locknuts 36. Bolt holes 38, 40 are preferably alignable with bolt holes through rear fender 24 so as to be attachable to the motorcycle frame members (not shown) using the same bolt holes normally used for attaching rear fender 24 to the motorcycle. Alternatively, it will be appreciated that receiver assembly 12 can be welded or otherwise releasably attached to a motorcycle frame in such position that it will be concealed beneath the rear fender without using the same bolt holes as are used for attachment of rear fender 24 to the motorcycle.

Figure 5:
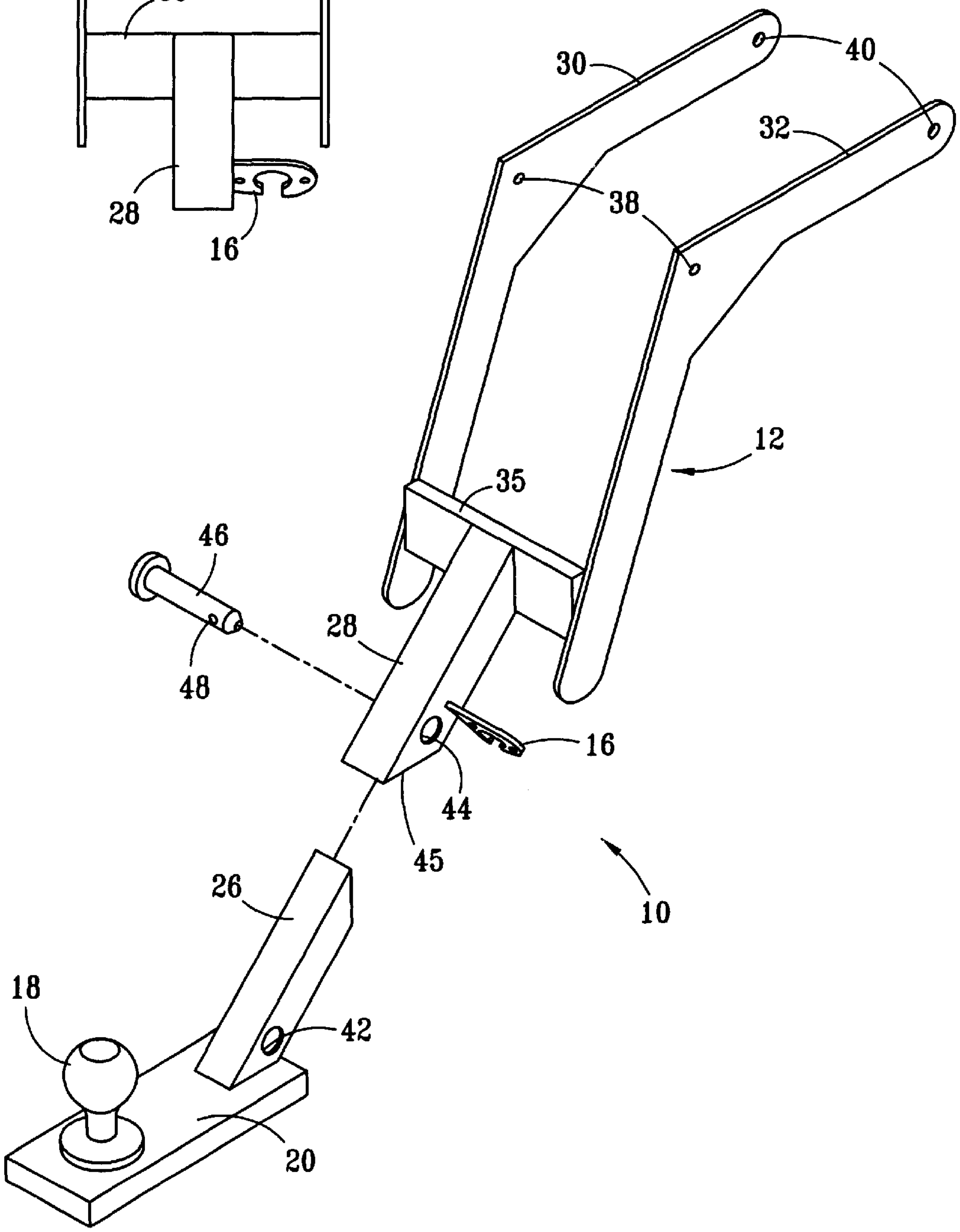
FIG. 5 is an exploded perspective view of the attachment device of the invention, with a trailer hitch mount depicted as the load supporting apparatus being utilized in combination with the concealable receiver assembly of the invention.

As shown in FIGS. 1–5, load supporting apparatus 14 of attachment device 10 is a trailer hitch mount comprising ball 18 having a downwardly extending post secured to support plate 20 using a conventional threaded nut 22. Attachment member 26 is desirably rigidly connected to support plate 20 by welding or other similarly effective means and is upwardly inclined so as to be releasably connectable to receiver member 28 of receiver assembly 12. According to a particularly preferred embodiment of the invention, attachment member 26 and receiver member 28 are axially alignable, and each is fabricated from square tubing, preferably made of steel, with dimensions such that attachment member 26 is insertable into sliding engagement with receiver member 28. Referring to FIG. 5, unlike with conventional receiver hitches, the angular position of receiver member 28 is such that its open end 45 faces downwardly rather than horizontally, and an attachment member 26 that is inclined relative to support plate 20 is needed in order to facilitate sliding engagement with receiver member 28. Cooperative means such as transverse bores 42, 44 are desirably provided in attachment member 26 and receiver member 28, respectively, which are alignable to permit insertion of connector pin 46. Connector pin 46 preferably further comprises a transverse bore 48 or other means facilitating attachment of a retainer clip (not shown) to secure connector pin 46 in transverse bores 42, 44.

Figure 6:
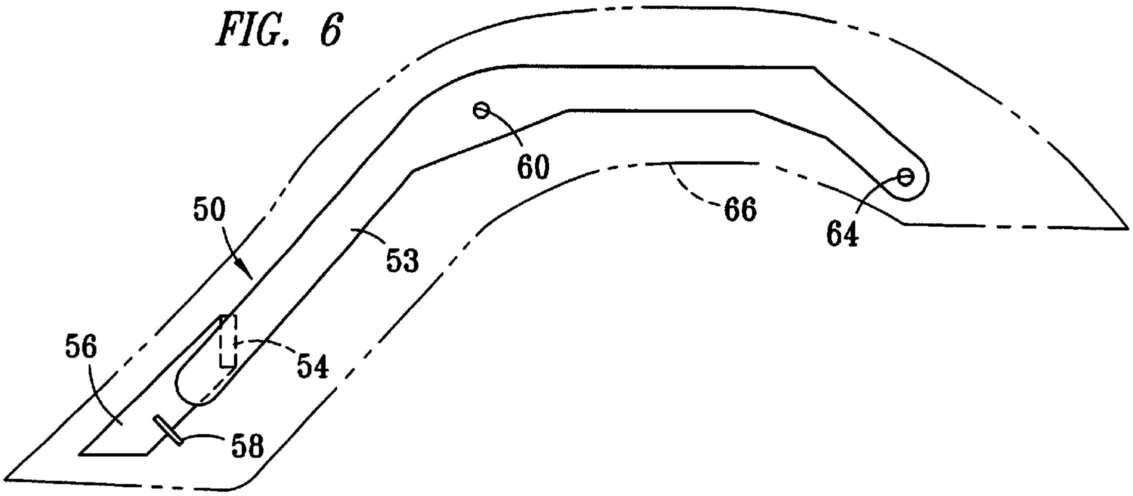
FIG. 6 is a side elevation view, partially in section, depicting an alternate embodiment of the concealed receiver assembly of the invention as installed under the rear fender (shown in phantom outline) of a motorcycle.
Figure 7:
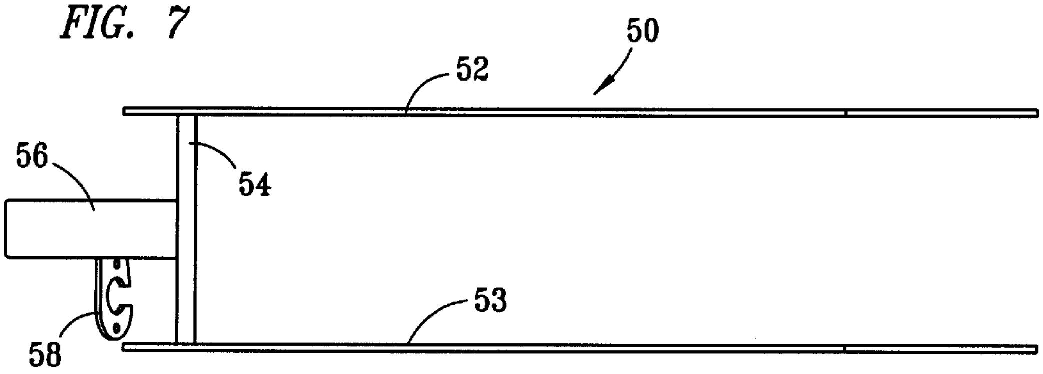
FIG. 7 is a top plan view depicting the concealable receiver assembly of FIG. 6, but not installed under a motorcycle fender as in FIG. 6.
Figure 8:
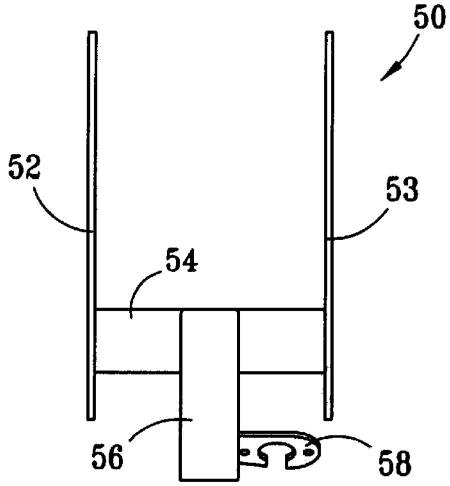
FIG. 8 is an elevation view of the concealable receiver assembly of FIG. 6, as seen from the rear when the receiver assembly is in essentially the same position as if installed under the rear fender of a motorcycle.
Figure 9:
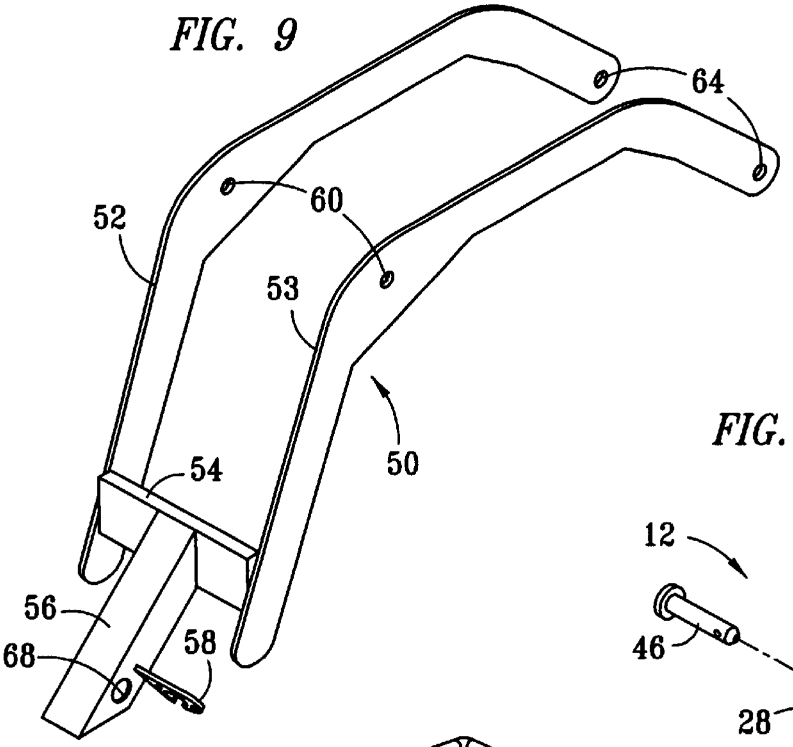
FIG. 9 is a perspective view of the concealable receiver assembly of FIG. 6, as viewed when not secured to a motorcycle.

Another receiver assembly 50, with differently configured longitudinal support members 52, 53, having differently positioned bolt holes 60, 64, to accommodate a differently configured rear fender 66 (FIG. 6) for a different motorcycle is described in relation to FIGS. 6–9. Here again, however, receiver assembly 50 is hidden from the ordinary observer when installed beneath fender 66 as shown in FIG. 6. In this embodiment of the invention, longitudinal support members 52, 53 are rigidly interconnected by transverse support member 54, which is preferably welded between them. Receiving member 56 depends from transverse support member 54 at a downwardly inclined angle and light connector mounting bracket 58 is attached to receiving member 56. Aperture 68 is provided to receive a connector pin as previously described in relation to FIG. 5 during the attachment of a load-supporting apparatus. As will become apparent to those of ordinary skill in the art upon reading this disclosure, other configurations can likewise be used within the scope of the invention for making receiver assembly 10 provided that the assembly is mountable in a concealed position between the rear fender of a motorcycle and the adjacent tire. Thus, for example, receiver assemblies having a different number and arrangement of structural elements or a embodying a different connector system for attaching the receiver assembly to a load-supporting apparatus can also be used within the scope of the present invention.

Figure 10:
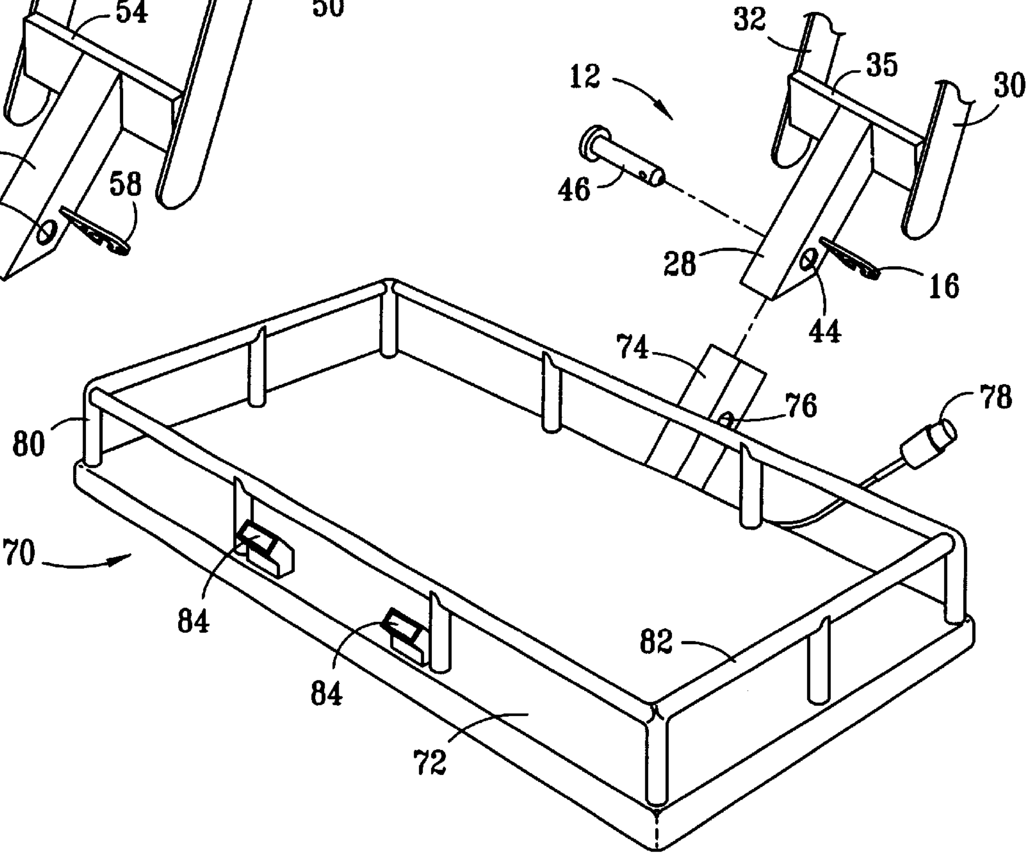
FIG. 10 is a perspective view of a cooler carrier apparatus positioned for attachment to the concealable receiver assembly of the invention, partially broken away, where the motorcycle is not visible.
Figure 11:
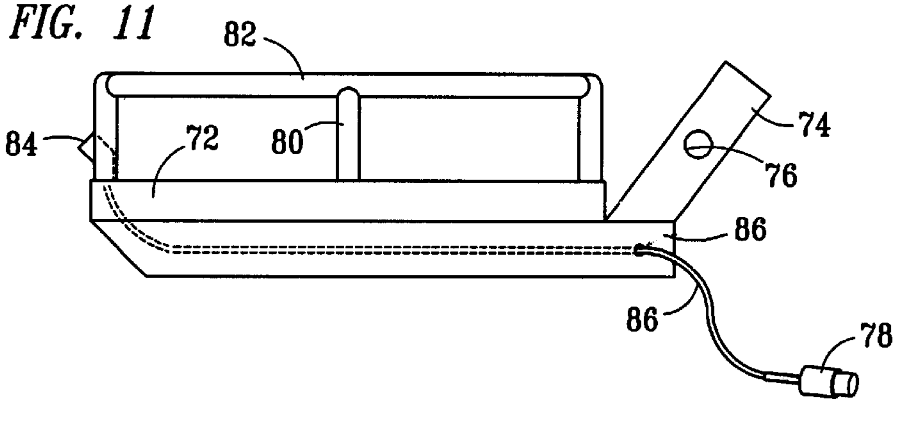
FIG. 11 is a side elevation view of the cooler carrier apparatus of FIG. 10.

FIGS. 10 and 11 disclose another preferred load-supporting apparatus, cooler carrier 70, of the type that can be used in combination with a receiver assembly in attachment device 10 of the invention. The lower portion of receiver assembly 12, as previously described in relation to FIGS. 1–5, is shown in FIG. 10 in alignment with attachment member 74 of cooler carrier 70 prior to slidably engaging and connecting the two using connector pin 46. The overhanging motorcycle fender under which receiver assembly 12 is concealed during use is not shown in FIG. 10 for ease of illustration. Cooler carrier 70 preferably comprises support plate 72, a perimeter fence around support plate 72 comprising horizontal members 82 supported by vertical members 80, upwardly inclined attachment member 74 with transverse aperture 76, and light connector 78 attached by electrical wire 88 to tail lights 84. It will be apparent upon reading this disclosure that a load supporting apparatus having the configuration illustrated in FIGS. 10–11 can also be used to transport objects other than, for example, an insulated cooler. If desired, elastic cords can be attached by hooks to horizontal supports 82 to secure such loads to carrier 70.

Figure 12:
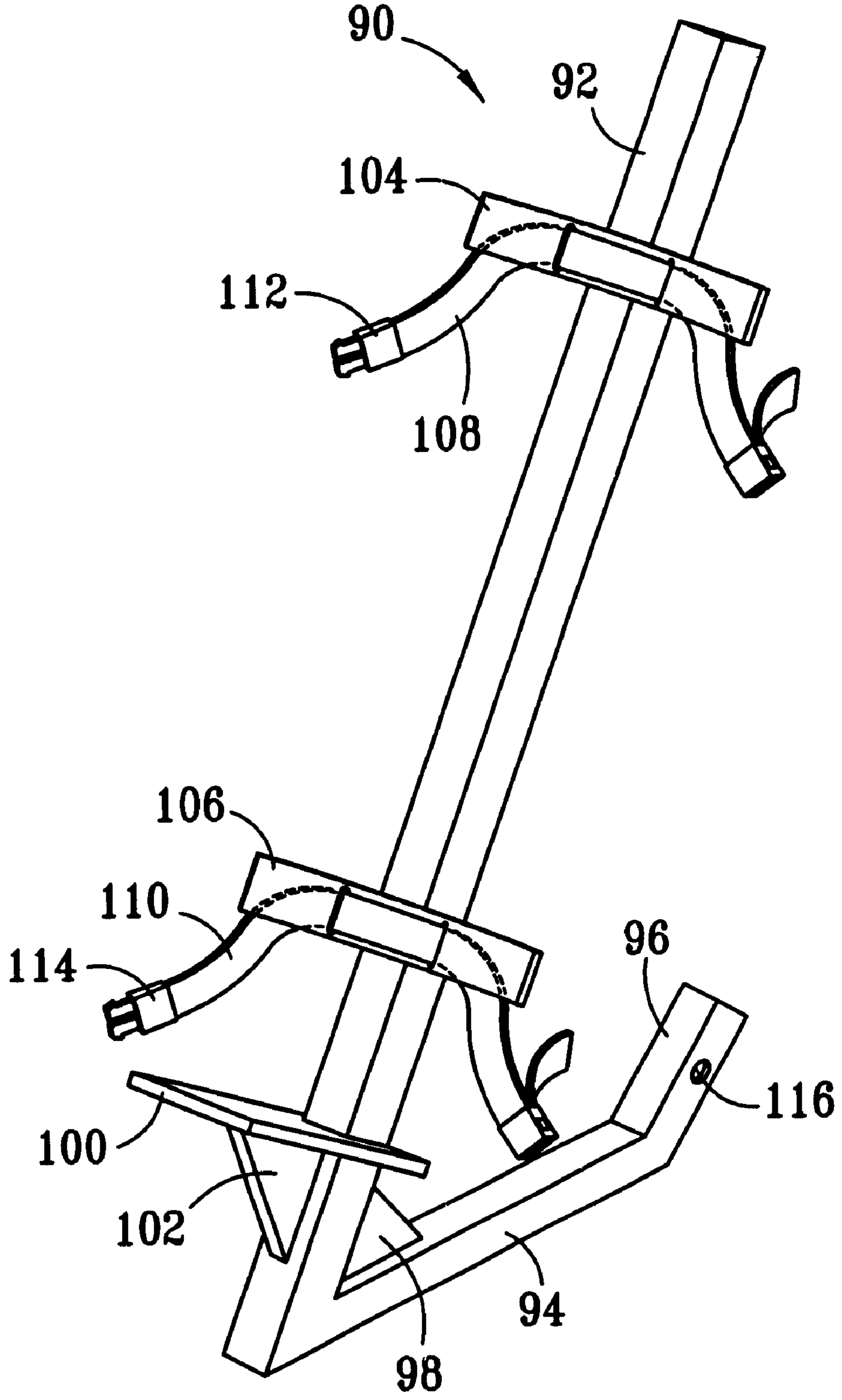
FIG. 12 is a perspective view of a golf club carrier apparatus attachable to the concealed receiver assembly of the invention.

Other special purpose load-supporting apparatus can likewise be used in combination with receiver assembly 12 as part of attachment device 10 of the invention. FIG. 12 discloses one such device, a golf bag carrier 90, preferably comprising inclined support member 92, horizontal support member 94, upwardly inclined attachment member 96 with transverse aperture 116, support platform 100 braced to inclined support member 92 by brace 102, and vertically spaced, arcuate, transverse bag supports 104, 106, against which a golf bag (not shown) is secured using web straps 108, 110 and buckles 112,114, respectively.

Load-supporting apparatus of the type disclosed herein should be utilized only when the combined weight of the apparatus and the supported load do not exceed the maximum safe load that can be placed rearwardly of the rear axle of a particular motorcycle without rendering the motorcycle unstable during operation.

Other alterations and modifications of the subject invention will likewise become apparent to those of ordinary skill in the art upon reading the present disclosure and it is intended that the scope of the invention disclosed herein be limited only by the broadest interpretation of the appended claims to which the inventor is legally entitled.

What is claimed is:

1. A receiver assembly is mounted in a concealed position under the rear fender structure of a motorcycle for use in quickly connecting and disconnecting load-supporting apparatus to the motorcycle, the assembly comprising at least two laterally spaced, longitudinal support members positionable under the fender and attachable in fixed relation to said motorcycle, the longitudinal support members having rearwardly extending distal ends, a transverse support member rigidly interconnecting the longitudinal support members near their distal ends, and a downwardly inclined receiver member depending from the transverse support member, said downwardly inclined receiver member being releasably connected to a portion of the load-supporting apparatus.

2. The receiver assembly of claim 1 wherein the receiver member is slidably engaged with and releasably connected to a portion of the load-supporting apparatus.

3. The receiver assembly of claim 2, further comprising a load supporting apparatus comprising a trailer hitch having a support member slidably engaged with and releasably attached to the receiver member.

4. The receiver assembly of claim 1, further comprising a load supporting apparatus having a carrier platform releasably connected to the receiver member.

5. The receiver assembly of claim 4 wherein the load supporting apparatus comprises a cooler carrier.

6. The receiver assembly of claim 4 wherein the load supporting apparatus comprises a golf bag carrier.

7. The receiver assembly of claim 1 wherein the downwardly inclined receiver member has a tubular cross-section.

8. The receiver assembly of claim 7 wherein the tubular cross-section is square.

9. The receiver assembly of claim 1, further comprising a brakelight connector mounting bracket.

10. The receiver assembly of claim 9 wherein the brakelight connector bracket is attached to the receiver member.

11. The receiver assembly of claim 1 wherein the downwardly inclined receiver member further comprises a transverse bore.

12. The receiver assembly of claim 11 in combination with a locking pin insertable into the transverse bore.

13. The receiver assembly of claim 1 wherein the longitudinal support members further comprise a plurality of bolt holes, wherein the bolt holes are aligned with a plurality of mounting holes in said fender.

* * * * *